United States Patent Office 3,142,645
Patented July 28, 1964

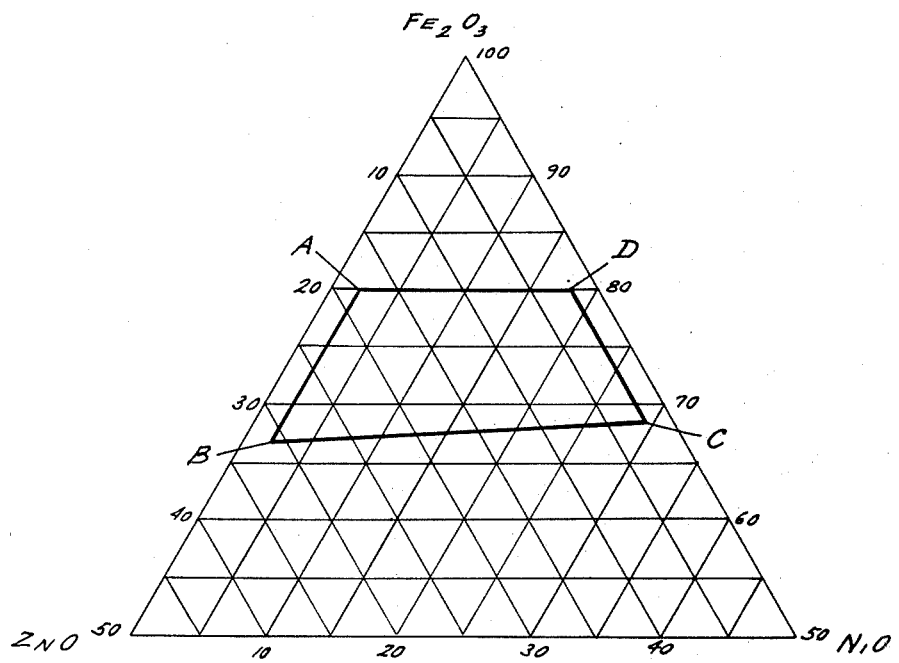

3,142,645
FERROMAGNETIC, CERAMIC BODY WITH A HIGH QUALITY FACTOR AT HIGH FREQUENCY
Georg Zerbes, Porz-Urbach, Germany, assignor, by direct and mesne assignments, to Steatit-Magnesia Aktiengesellschaft, Lauf, Pegnitz, Germany, a corporation of Germany, and Indiana General Corporation, Valparaiso, Ind., a corporation of Indiana
Filed Aug. 11, 1958, Ser. No. 754,371
1 Claim. (Cl. 252—62.5)

This invention relates to a ferromagnetic ceramic body containing the constituents iron oxide, zinc oxide, and nickel oxide. Such bodies, which have a spinel structure to which is attributed the general formula MeO. $Fe_2O_3$ (Me standing for one or more metals) are ferromagnetic and have been known for a long time. It has already been proposed in answer to the growing and ever more demanding requirements of the electrical industry, to add materials to such compositions in order to attain a higher quality value or Q-factor in the bodies especially at high frequencies.

This application is a continuation-in-part of my U.S. application Serial No. 467,828 filed November 9, 1954, now abandoned.

This invention is based on the discovery that certain small additions of cobalt oxide favorably modify the properties of nickel-zinc ferrites so that high quality values or Q-factors are obtained in the high frequency range of 200–300 mcs., for example.

The drawing is a triaxial diagram of the three component system ZnO, NiO and $Fe_2O_3$ showing in weight percent in quadrangle area ABCD, the group of such compositions to which the invention is applicable.

The corners of the area ABCD represent the following compositions in weight percent.

A is 18% ZnO, 2% NiO and 80% $Fe_2O_3$,
B is 31.5% ZnO, 2% NiO and 66.5% $Fe_2O_3$,
C is 2% ZnO, 29.5% NiO and 68.5% $Fe_2O_3$,
D is 2% ZnO, 18% NiO and 80% $Fe_2O_3$.

The lower line B–C of the quadrange is just above the 50 mol percent line for $Fe_2O_3$. It has been found that at least enough ferric oxide should be present to react with all the bivalent oxides in the composition including ZnO, NiO, CoO. Thus, the composition employed will be above the line B–C but need be only slightly above this line when amounts close to the minimum required for CoO are added. The excess of ferric oxide over the 50 mol percent based on the nickel and zinc content is important because it has been found that ferric oxide reacts preferentially with nickel oxide and zinc oxide before it reacts with cobalt oxide and for the cobalt oxide to be effective at least a major portion thereof should be in the form of a ferrite.

The addition of cobalt oxide is effective as a quality improver not only in pure zinc-nickel ferrites. A valuable feature of the invention relates also to the fact that most impurities as they occur in technical grades of the raw materials (i.e., in zinc oxide, nickel oxide and iron oxide), if they are not present in too great a quantity, do not disturb the result. Attention is called to the fact that the customary impurity of cobalt oxide in good technical grade nickel oxide is less than the percentage of cobalt oxide which will be established as singularly effective according to this invention. The composition of the invention will tolerate, in part, also larger amounts of other impurities besides cobalt oxide without diminishing quality-improving effects, the elements of adjacent groups and of the 2nd, 3rd and 4th main groups of the periodic table being possible impurities.

In Table 1 the measured quality values are compared. Different proportions of additions of cobalt oxide, or a cobalt compound which on heating goes over to the oxide, naturally change the properties of the manufactured ferromagnetic body. With increasing cobalt content, the Q-factor increases up to a maximum and then again diminishes.

The useful improvement in the quality through the incorporation of cobalt in the ferrite lattice according to the invention is found when between 1 and 60 weight percent of cobalt oxide determined as CoO and with respect to the content of NiO. The amount of cobalt oxide based on the total weight of the composition is between 0.1 and 3%, but no less than 1% or no more than 60% based on the content of nickel oxide is employed.

The ferrites which are the basis of the invention are prepared and measured as follows: The raw materials with an addition of water and an organic binding agent are ground in a ball mill, the slurry mass is dried, pulverized and then pressed to form a ring. The ring is fired in air at a temperature between 1100 and 1350° C., after cooling is provided it is wound with 28 turns of 0.3 mm. thick, lacquered copper wire and the quality and inductivity is measured in the radio broadcast frequency range on a commercial Q- and L-measuring apparatus. From the inductivity and the dimensions of the ring the initial permeability $\mu$ is determined. With 28 turns, not the maximum Q value of the materials but serviceable comparable values are displayed, so that the method of preparation with all batches are substantially similarly considered except for the firing temperature. These have been varied somewhat so that comparable initial permeability values in the range of the maximum Q-value results. In order not to be too voluminous the quality factor at one megacycle is given.

Table 1

| Ex. No. | Composition in Weight percent | | | $\mu$ | Q at 1 mc. without addn. of CoO | Q at 1 mc. with addn. of CoO (0.7% of the batch) | Q improvement, percent | CoO: 100 NiO |
|---|---|---|---|---|---|---|---|---|
| | ZnO | NiO | $Fe_2O_3$ | | | | | |
| 1 | 12.5 | 20.0 | 67.5 | 50 | 78 | 128 | 64 | 3.5 |
| 2 | 17.0 | 6.6 | 76.4 | 100 | 58 | 130 | 124 | 10.6 |

Example 1 was fired at 1150 or 1180° C. respectively, Example 2 at 1170 or 1250° C. respectively.

The products of this invention are exceptionally adapted to the manufacture of antenna cores, being superior to any similar core material yet found for such purposes.

I claim:

A magnetic core material having a high quality factor at high frequencies and especially useful for antenna cores, comprising a sintered nickel-zinc ferrite consisting essentially of the weight percent composition within the area A–B–C–D of the drawing comprising in addition 1–60% by weight of cobalt oxide based upon the proportion of nickel oxide in said composition, the amount of cobalt oxide being within 0.1 to 3.0% based on the total weight percent of said composition and the amount of ferric oxide in said composition being at least 50 mol percent of the entire composition including the CoO, said product having been sintered at about 1100–1350° C.

References Cited in the file of this patent

UNITED STATES PATENTS

| | | |
|---|---|---|
| 2,656,319 | Berge | Oct. 20, 1953 |
| 2,700,023 | Albers-Schoenberg | Jan. 18, 1955 |
| 2,723,239 | Harvey | Nov. 8, 1955 |

(Other references on following page)

| | UNITED STATES PATENTS | | 752,659 | Great Britain | July 11, 1956 |
|---|---|---|---|---|---|
| 2,736,708 | Crowley et al. | Feb. 28, 1956 | 756,374 | Great Britain | Sept. 5, 1956 |
| 2,925,388 | Harvey | Feb. 16, 1960 | | | |

FOREIGN PATENTS

| 1,100,865 | France | Apr. 13, 1955 |
|---|---|---|
| 751,623 | Great Britain | July 4, 1956 |

OTHER REFERENCES

Smith's College Chemistry, 6th edition, page 643, published by D. Appleton-Century Company, New York (1946).

Disclaimer 3,142,645.—*Georg Zerbes*, Porz-Urbach, Germany. FERROMAGNETIC, CERAMIC BODY WITH A HIGH QUALITY FACTOR AT HIGH FREQUENCY. Patent dated July 28, 1964. Disclaimer filed July 2, 1964, by the assignees, *Steatit-Magnesia Aktiengesellschaft* and *Indiana General Corporation*.

Hereby disclaims the terminal portion of the term of the patent subsequent to May 22, 1979.

[*Official Gazette September 29, 1964.*]